US009520951B2

(12) United States Patent
Li et al.

(10) Patent No.: US 9,520,951 B2
(45) Date of Patent: Dec. 13, 2016

(54) SIGNAL TRANSMISSION METHOD, TRANSMITTER, AND SIGNAL TRANSMISSION SYSTEM

(71) Applicant: Huawei Technologies Co., Ltd., Shenzhen (CN)

(72) Inventors: Zhaohui Li, Guangzhou (CN); Linghao Cheng, Guangzhou (CN); Ke Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 14/569,417

(22) Filed: Dec. 12, 2014

(65) Prior Publication Data

US 2015/0098712 A1    Apr. 9, 2015

Related U.S. Application Data

(63) Continuation of application No. PCT/CN2012/076900, filed on Jun. 14, 2012.

(51) Int. Cl.
*H04B 10/08* (2006.01)
*H04B 10/564* (2013.01)
(Continued)

(52) U.S. Cl.
CPC ........ *H04B 10/564* (2013.01); *H04B 10/0775* (2013.01); *H04B 10/0779* (2013.01); *H04L 25/022* (2013.01)

(58) Field of Classification Search
CPC .............. H04B 10/564; H04B 10/0775; H04B 2210/078; H04B 10/0779; H04B 10/077; H04B 10/0773; H04B 10/079; H04B 10/0793; H04B 10/0795; H04B 10/07955; H04L 25/022
(Continued)

(56) References Cited

U.S. PATENT DOCUMENTS 8,229,008 B2    7/2012 Jones et al.
2007/0263737 A1    11/2007 Li et al.
(Continued)

FOREIGN PATENT DOCUMENTS

CN    1756246 A    4/2006
CN    101228756 A    7/2008
(Continued)

OTHER PUBLICATIONS

Kanprachar, S., "Modeling, Analysis, and Design of Subcarrier Multiplexing on Multimode Fiber," dissertation submitted to the Faculty of the Virginia Polytechnic Instituted and State University in partial fulfillment of the requirements for the degree of Doctor of Philosophy in Electrical Engineering, Mar. 2003, 202 pages.
(Continued)

*Primary Examiner* — M. R. Sedighian
(74) *Attorney, Agent, or Firm* — Slater Matsil, LLP

(57) ABSTRACT

Embodiments of the present invention relate to a signal transmission method, transmitter, and signal transmission system. The method includes: obtaining, by a sending end, information about a power fading point of a fiber channel between the sending end and a receiving end; determining, by the sending end and according to the information about the power fading point, a subcarrier that is used to send a service signal to the receiving end on the fiber channel, where a frequency of the determined subcarrier is different from that of the power fading point; and sending, by the sending end, a service signal to the receiving end by using the determined subcarrier. According to the embodiments of the present invention, validity of a signal spectrum is ensured, and therefore it is ensured that transmitted data can be effectively recovered at a receiving end.

12 Claims, 3 Drawing Sheets

(51) Int. Cl.
*H04B 10/077* (2013.01)
*H04L 25/02* (2006.01)

(58) Field of Classification Search
USPC .............................................. 398/38, 33, 30
See application file for complete search history.

(56) References Cited

U.S. PATENT DOCUMENTS

| | | |
|---|---|---|
| 2009/0219800 A1 | 9/2009 | Bocquet |
| 2010/0054735 A1* | 3/2010 | Wei .................... H04J 14/0282 398/26 |
| 2011/0026924 A1 | 2/2011 | Chung et al. |

FOREIGN PATENT DOCUMENTS

| | | |
|---|---|---|
| CN | 101390357 A | 3/2009 |
| CN | 101465692 A | 6/2009 |
| CN | 101848063 A | 9/2010 |
| EP | 1791283 A1 | 5/2007 |
| WO | 2007138476 A1 | 12/2007 |

OTHER PUBLICATIONS

Gao, Y., et al., "Direct-Detection Optical OFDM Transmission System with Pre-Emphasis Technique," Journal of Lightwave Technology, vol. 29, No. 14, Jul. 15, 2011, pp. 2138-2145.

Giddings, R.P., et al., "Experimental Demonstration of a Record High 11.25Gb/s Real-Time Optical OFDM Transceiver Supporting 25 km SMF End-to-End Transmission in Simple IMDD Systems," Optics Express, vol. 18, No. 6, Mar. 15, 2010, pp. 5541-5555.

* cited by examiner

SIGNAL TRANSMISSION METHOD, TRANSMITTER, AND SIGNAL TRANSMISSION SYSTEM

This application is a continuation of International Application No. PCT/CN2012/076900, filed on Jun. 14, 2012, which is hereby incorporated by reference in its entirety.

TECHNICAL FIELD

Embodiments of the present invention relate to the field of communications technologies, and in particular, to a signal transmission method, transmitter, and signal transmission system.

BACKGROUND

Currently, in a communications system, fiber optic communication is generally performed in an intensity modulation with direct detection (IM-DD) manner. However, chirping in the system and dispersion on a link cause power fading of a modulating signal and affect normal transmission of a signal.

In the prior art, at a sending end, a signal that is input in a bit manner undergoes quadrature amplitude modulation (QAM) mapping, undergoes up-conversion processing, is sequentially input to a drive and an optical modulator, and then enters a fiber channel; and at a receiving end, a signal is received from the fiber channel, sequentially input to an optical amplifier, a filter, and an optical-to-electrical converter, and then output in a bit manner. However, in the prior art, a signal spectrum obtained by the receiving end is continuous, but for a spectrum near a subcarrier (that is, a fading point) where power fading occurs, signal spectrum validity is damaged due to existence of noise, so that valid data cannot be recovered.

SUMMARY

Embodiments of the present invention provide a signal transmission method, transmitter, and signal transmission system, so as to ensure validity of a signal spectrum and ensure that transmitted data can be effectively recovered at a receiving end.

According to one aspect, an embodiment of the present invention provides a signal transmission method, including obtaining, by a sending end, information about a power fading point of a fiber channel between the sending end and a receiving end. The method further includes determining, by the sending end and according to the information about the power fading point, a subcarrier that is used to send a service signal to the receiving end on the fiber channel. A frequency of the determined subcarrier is different from that of the power fading point. A service signal is sent, by the sending end, to the receiving end by using the determined subcarrier.

According to another aspect, an embodiment of the present invention provides a transmitter, including a processor configured to obtain information about a power fading point of a fiber channel between the transmitter and a receiving end; and determine, according to the information about the power fading point, a subcarrier that is used to send a service signal to the receiving end on the fiber channel. A frequency of the determined subcarrier is different from that of the power fading point. The transmitter further includes a sender configured to send a service signal to the receiving end by using the determined subcarrier.

According to another aspect, an embodiment of the present invention further provides a signal transmission system, including a transmitter provided in an embodiment of the present invention and a receiver provided in an embodiment of the present invention.

According to the signal transmission method, transmitter, and signal transmission system provided in the embodiments of the present invention, a sending end determines, according to information about a power fading point of a fiber channel between the sending end and a receiving end, a subcarrier that is used to send a service signal to the receiving end on the fiber channel; and sends a service signal to the receiving end on the determined subcarrier. When sending the service signal, the sending end can bypass the power fading point, thereby ensuring validity of a signal spectrum and ensuring that transmitted data can be effectively recovered at the receiving end.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
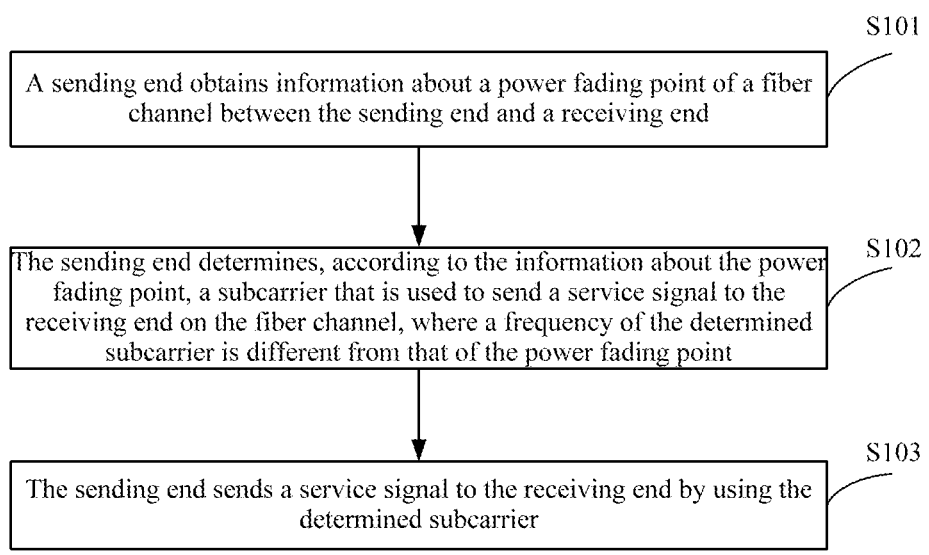
FIG. 1 is a flowchart of an embodiment of a signal transmission method provided in the present invention.

FIG. 1 is a flowchart of an embodiment of a signal transmission method provided in the present invention. As shown in FIG. 1, the method includes the following.

S101: A sending end obtains information about a power fading point of a fiber channel between the sending end and a receiving end.

S102: The sending end determines, according to the information about the power fading point, a subcarrier that is used to send a service signal to the receiving end on the fiber channel, where a frequency of the determined subcarrier is different from that of the power fading point.

S103: The sending end sends a service signal to the receiving end by using the determined subcarrier.

The signal transmission method provided in the embodiment of the present invention is applicable to communications systems of various types, such as optical-orthogonal frequency division multiplexing (O-OFDM). An entity for executing the foregoing steps, that is, the sending end, may be any type of signal transmitting device.

Optionally, the sending end may obtain a frequency domain response of the fiber channel between the sending end and the receiving end, and determines the power fading point of the fiber channel according to the frequency domain response.

For example, the sending end may send a first test signal to the receiving end, where, after passing through the fiber channel, the first test signal arrives at the receiving end; and the receiving end may perform channel estimation on the fiber channel between the sending end and the receiving end according to the received first test signal, so as to obtain the frequency domain response of the fiber channel. In a process in which the receiving end performs channel estimation according to the received first test signal, various existing channel estimation methods may be used. The receiving end may send the obtained frequency domain response to the sending end.

Because the frequency domain response of the fiber channel between the sending end and the receiving end reflects how a signal on each subcarrier of the fiber channel between the sending end and the receiving end is affected by fading, the frequency domain response of the fiber channel between the sending end and the receiving end can indicate the information about the power fading(fading) point on the fiber channel between the sending end and the receiving end, where the power fading point is a subcarrier that encounters power decreasing (fading), and the information about the power fading point may be information about the subcarrier that encounters power fading. The sending end may determine, according to the information about the power fading point, the subcarrier that is used to send a service signal to the receiving end on the fiber channel. The frequency of the determined subcarrier may be different from that of the power fading point. When sending a signal service to the receiving end, the sending end may send the service signal to the receiving end on the determined subcarrier, so that the power fading point on the fiber channel can be bypassed, thereby ensuring validity of a signal spectrum and ensuring that transmitted data can be effectively recovered at the receiving end.

It should be noted that, distribution of the power fading point is generally related to a distance between the sending end and the receiving end, and when the distance between the sending end and the receiving end is fixed, a position of the power fading point is also fixed. On this basis, in the embodiment of the present invention, the sending end may obtain a frequency domain response of each of fiber channels with multiple kinds of transmission distances, and correspondingly, the sending end may determine a power fading point of each fiber channel with a corresponding transmission distance according to a frequency domain response of the fiber channel with the corresponding transmission distance. Further, when the information about the power fading point is specifically information about the power fading point of each of the fiber channels with multiple kinds of transmission distances, the sending end may determine, according to information about the power fading point of the fiber channel with each kind of transmission distance, a subcarrier that is used to send a service signal on the fiber channel with the kind of transmission distance, where the frequency of the determined subcarrier that is used to send a service signal on the fiber channel with each kind of transmission distance is different from that of the power fading point of the fiber channel with this kind of transmission distance.

At each kind of transmission distance, the sending end may send a service signal to the receiving end on a subcarrier determined at this kind of transmission distance, thereby bypassing the power fading point on the fiber channel, ensuring validity of a signal spectrum, and ensuring that transmitted data can be effectively recovered at the receiving end.

In a communications system, the distance between the sending end and the receiving end may be generally 10 km-80 km, and 10 km-80 km may be divided into a plurality of set distances, for example, may be divided at an interval of 5 km, and the sending end may separately obtain the frequency domain response of the fiber channel between the sending end and the receiving end in scenarios where set distances are 10 km, 15 km, 20 km, . . . , and 80 km, and further obtain, in the scenarios where set distances are 10 km, 15 km, 20 km, . . . , and 80 km, the information about the power fading point and the subcarrier that is used to send a service signal to the receiving end. Correspondingly, the sending end selects, according to a transmission distance of the fiber channel between the sending end and the receiving end, a corresponding subcarrier for sending a service signal from the subcarrier that is applicable to multiple kinds of distances and is previously determined.

On a basis of the determining the power fading point in the foregoing embodiment, to improve a utilization rate of system bandwidth, optionally, after determining the subcarrier that is used to send a service signal to the receiving end on the fiber channel, the sending end may further divide the determined subcarrier into at least two parts, and determine a modulation scheme for sending a service signal on each part of the subcarrier.

For example, the sending end may use different modulation schemes on a subcarrier with a relatively good channel response and on a subcarrier with a relatively poor channel response, so that more service signals may be sent on the subcarrier with a relatively good channel response, and a relatively small number of service signals, or even no service signal, may be sent on the subcarrier with a relatively poor channel response, thereby improving a bandwidth utilization rate.

Optionally, the sending end may use a higher-order modulation scheme on a subcarrier with a relatively good channel response, and use a lower-order modulation scheme on a subcarrier with a relatively poor channel response. For example, in an implementation scenario where quadrature amplitude modulation (QAM) is used, the sending end may use a 64QAM scheme on the subcarrier with a relatively good channel response to perform modulation, and may use a 32QAM, 16QAM, or quadrature phase shift keying (QPSK) scheme on the subcarrier with a relatively poor channel response to perform modulation.

Optionally, the sending end may send a second test signal on the determined subcarrier by using at least two kinds of modulation schemes, and correspondingly, the sending end may determine, in the determined subcarrier, a subcarrier applicable to each kind of modulation scheme according to a performance indicator, of the second test signal, that is corresponding to each kind of modulation scheme at the receiving end.

For example, the sending end sends the second test signal on the determined subcarrier by using a first kind of modulation scheme, and after receiving the second test signal sent by the sending end, the receiving end may determine a performance indicator condition of the second test signal received on the subcarrier, and feedback the performance indicator condition to the sending end, where the performance indicator may include a bit error rate and/or a signal-to-noise ratio.

In an implementation scenario, the sending end may send, by sequentially using different modulation schemes, a test signal on all subcarriers that are used to send a service signal. For example, a test signal may be first sent on all subcarriers by using the 64 quadrature amplitude modulation (QAM) scheme, then a test signal is sent on all subcarriers by using the 32QAM scheme, and then a test signal is sent on all subcarriers by using the 16QAM scheme, and so on. The sending end may compare a performance indicator of each subcarrier in each kind of modulation scheme, where the performance indicator may include a bit error rate and/or a signal-to-noise ratio, and the like. For any one subcarrier, among modulation schemes whose performance indicator meets a preset performance indicator requirement, a highest-order modulation scheme is selected as a modulation scheme for sending a service signal on the subcarrier. For example, for any one subcarrier, among test signals that are sent by using the 64QAM, 32QAM, 16QAM, and QPSK modulation schemes, bit error rates of all the test signals are lower than a preset bit error rate requirement, and then the sending end may determine that the modulation scheme used for sending a service signal on the subcarrier is the 64QAM modulation scheme. For another example, for any one subcarrier, among test signals that are sent by using the 64QAM, 32QAM, 16QAM, and QPSK modulation schemes, a signal-to-noise ratio of a test signal sent by using the 16QAM modulation scheme and a signal-to-noise ratio of a test signal sent by using the QPSK modulation scheme both meet a preset signal-to-noise ratio requirement, and a signal-to-noise ratio of a test signal sent by using the 64QAM modulation scheme or a signal-to-noise ratio of a test signal sent by using the 32QAM modulation scheme does not meet the preset signal-to-noise ratio requirement, and then the sending end may determine that the modulation scheme used for sending a service signal on the subcarrier is the 16QAM modulation scheme.

In another implementation scenario, when part of a performance indicator of the second test signal in the second test signal that is sent by using the first kind of modulation scheme and received at the receiving end is poorer than a set value, for example, a bit error rate is higher than a set value, and/or a signal-to-noise ratio is lower than a set value, the sending end may send, by using a second kind of modulation scheme, the second test signal on a subcarrier corresponding to a second test signal whose performance indicator is poorer than the set value.

When part of a performance indicator of the second test signal in the second test signal that is sent by using the first kind of modulation scheme and received at the receiving end is not poorer than a set value, for example, a bit error rate is lower than a set value, and/or a signal-to-noise ratio is higher than a set value, the sending end may set a subcarrier corresponding to a second test signal whose performance indicator is not poorer than the set value and that is sent by using the first kind of modulation scheme and received at the receiving end as a subcarrier applicable to sending a service signal by using the first kind of modulation scheme.

It can be understood that, when part of a performance indicator of the second test signal in the second test signal that is sent by using the second kind of modulation scheme and received at the receiving end is not poorer than a set value, the sending end may set a subcarrier corresponding to a second test signal whose performance indicator is not poorer than the set value and that is sent by using the second kind of modulation scheme and received at the receiving end as a subcarrier applicable to sending a service signal by using the second kind of modulation scheme.

In still another implementation scenario, the sending end may send the second test signal on the determined subcarrier by using N kinds of modulation schemes, and correspondingly, the sending end may determine, in the determined subcarrier, a subcarrier applicable to each of the N kinds of modulation schemes according to a performance indicator, of the second test signal, that is corresponding to each kind of modulation scheme at the receiving end, where N is an integer greater than or equal to 2.

That the sending end sends the second test signal on the determined subcarrier by using N kinds of modulation schemes may be specifically that: the sending end sends the second test signal on the determined subcarrier by using the first kind of modulation scheme; and when part of a performance indicator of the second test signal in the second test signal that is sent by using an $i^{th}$ kind of modulation scheme and received at the receiving end is poorer than a set value, the sending end sends, by using an $(i+1)^{th}$ kind of modulation scheme, the second test signal on a subcarrier corresponding to a second test signal whose performance indicator is poorer than the set value, where i is an integer that is greater than or equal to 1 and less than or equal to (N−1), and an order of the first kind of modulation scheme, a second kind of modulation scheme, . . . , and an $N^{th}$ kind of modulation scheme decreases sequentially.

Correspondingly, the determining, in the determined subcarrier, a subcarrier applicable to each of the N kinds of modulation schemes according to a performance indicator, of the second test signal, that is corresponding to each kind of modulation scheme at the receiving end specifically includes setting a subcarrier corresponding to a second test signal whose performance indicator is not poorer than the set value and that is sent by using the $i^{th}$ kind of modulation scheme and received at the receiving end as a subcarrier applicable to sending a service signal by using the $i^{th}$ kind of modulation scheme. To sum up, the sending end may send a service signal on the corresponding subcarrier by using the modulation scheme in which a service signal is sent on each part of the subcarrier.

Compared with lower order modulation, in higher order modulation, more data may be modulated to a subcarrier. Therefore, optionally, an order of the first kind of modulation scheme may be higher than an order of the second kind of modulation scheme, so as to improve a utilization rate of system bandwidth.

For example, when the first kind of modulation scheme is the 64QAM scheme, the second kind of modulation scheme may be the 32QAM scheme, the 16QAM scheme, or the QPSK scheme.

It should be noted that, in an implementation scenario where a second modulation manner is a lowest-order modulation scheme, for example, the QPSK scheme, if part of a performance indicator of the second test signal in the second test signal that is sent by using the second kind of modulation scheme and received at the receiving end is still poorer than a set value, the sending end may not send service data to the receiving end on the subcarrier.

According to the signal transmission method provided in the embodiment of the present invention, a sending end determines, according to information about a power fading point of a fiber channel between the sending end and a receiving end, a subcarrier that is used to send a service signal to the receiving end on the fiber channel; and sends a service signal to the receiving end on the determined subcarrier, so that, when sending the service signal, the sending end can bypass the power fading point, thereby ensuring validity of a signal spectrum and ensuring that transmitted data can be effectively recovered at the receiving end.

Figure 2:
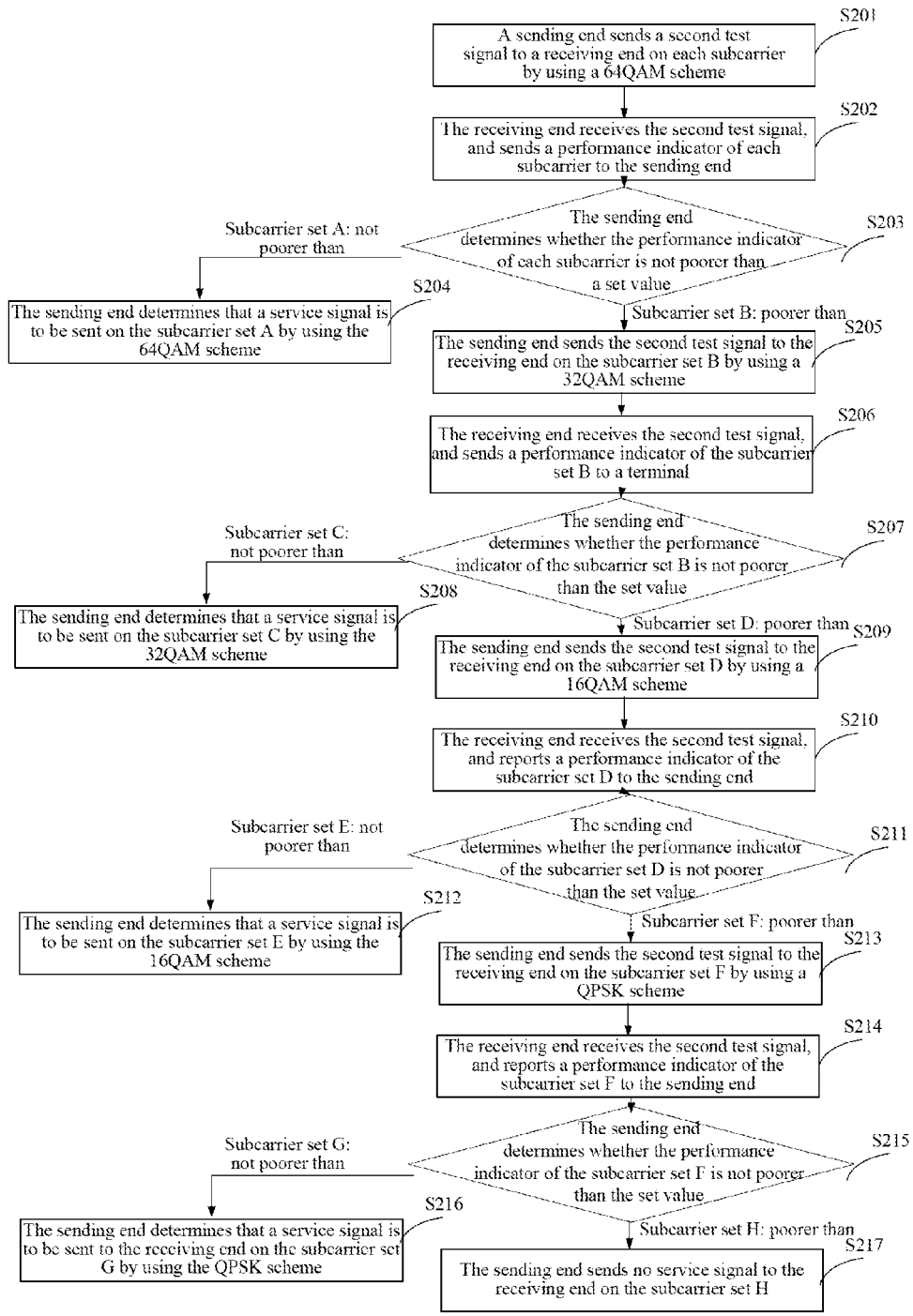
FIG. 2 is a flowchart of another embodiment of the signal transmission method provided in the present invention.

FIG. 2 is a flowchart of an embodiment provided in the present invention in which a modulation scheme used for sending a service signal on each part of a subcarrier is determined. As shown in FIG. 2, in this embodiment, in an implementation scenario where a sending end uses a QAM modulation scheme, a specific process of determining a modulation scheme of each part of a subcarrier by sending a second test signal to a receiving end is provided. The method includes the following steps.

S201: A sending end sends a second test signal to a receiving end on each subcarrier by using a 64QAM scheme.

S202: The receiving end receives the second test signal, and sends a performance indicator of each subcarrier to the sending end.

S203: The sending end determines whether the performance indicator of each subcarrier is not poorer than a set value, performs S204 for a subcarrier set A with the performance indicator of each subcarrier within the subcarrier set not poorer than the set value, and performs S205 for a subcarrier set B whose performance indicator is poorer than the set value.

The subcarrier set A may include at least one subcarrier, the subcarrier set B may also include at least one subcarrier, a universal set of the subcarrier set A and the subcarrier set B is a subcarrier set that is determined by the sending end and used to send a service signal to a receiving end, and the subcarrier set A and the subcarrier set B do not have an intersection set.

S204: The sending end determines that a service signal is to be sent to the receiving end on a subcarrier of the subcarrier set A by using the 64QAM scheme.

S205: The sending end sends the second test signal to the receiving end on a subcarrier of the subcarrier set B by using a 32QAM scheme.

S206: The receiving end receives the second test signal, and sends a performance indicator of each subcarrier included in the subcarrier set B to the sending end.

S207: The sending end determines whether a performance indicator of each subcarrier included in the subcarrier set B is not poorer than the set value, performs S208 for a subcarrier set C whose performance indicator is not poorer than the set value, and performs S209 for a subcarrier set D whose performance indicator is poorer than the set value.

The subcarrier set C may include at least one subcarrier, the subcarrier set D may also include at least one subcarrier, a universal set of the subcarrier set C and the subcarrier set D is the subcarrier set B, and the subcarrier set C and the subcarrier set D do not have an intersection set.

S208: The sending end determines that a service signal is to be sent to the receiving end on the subcarrier set C by using the 32QAM scheme.

S209: The sending end sends the second test signal to the receiving end on the subcarrier set D by using a 16QAM scheme.

S210: The receiving end receives the second test signal, and sends a performance indicator of each subcarrier included in the subcarrier set D to the sending end.

S211: The sending end determines whether the performance indicator of each subcarrier included in the subcarrier set D is not poorer than the set value, performs S212 for a subcarrier set E whose performance indicator is not poorer than the set value, and performs S213 for a subcarrier set F whose performance indicator is poorer than the set value.

The subcarrier set E may include at least one subcarrier, the subcarrier set F may also include at least one subcarrier, a universal set of the subcarrier set E and the subcarrier set F is the subcarrier set D, and the subcarrier set E and the subcarrier set F do not have an intersection set.

S212: The sending end determines that a service signal is to be sent to the receiving end on the subcarrier set E by using the 16QAM scheme.

S213: The sending end sends the second test signal to the receiving end on the subcarrier set F by using a QPSK scheme.

S214: The receiving end receives the second test signal, and sends a performance indicator of each subcarrier included in the subcarrier set F to the sending end.

S215: The sending end determines whether the performance indicator of each subcarrier included in the subcarrier set F is not poorer than the set value, performs S216 for a subcarrier set G whose performance indicator is not poorer than the set value, and performs S217 for a subcarrier set H whose performance indicator is poorer than the set value.

The subcarrier set G may include at least one subcarrier, the subcarrier set H may also include at least one subcarrier, a universal set of the subcarrier set G and the subcarrier set H is the subcarrier set F, and the subcarrier set G and the subcarrier set H do not have an intersection set.

S216: The sending end determines that a service signal is to be sent to the receiving end on the subcarrier set G by using the QPSK scheme.

S217: The sending end determines that no service signal is to be sent to the receiving end on the subcarrier set H.

In this embodiment, each time the sending end sends a second test signal, the receiving end reports, to the sending end, a performance indicator of a subcarrier on which the second test signal is sent. It can be understood that, the receiving end may also determine a modulation scheme of a service signal that is on the subcarrier on which the second test signal is sent, and report the modulation scheme to the sending end.

In this embodiment, a sending end may determine that, more data is to be modulated on a subcarrier with a relatively good performance indicator by using a higher-order modulation scheme, thereby improving a utilization rate of system bandwidth.

Persons of ordinary skill in the art may understand that all or a part of the steps of the method embodiments may be implemented by a program instructing relevant hardware. The foregoing program may be stored in a computer readable storage medium. When the program runs, the steps of the method embodiments are performed. The foregoing storage medium includes: any medium that can store program code, such as a ROM, a RAM, a magnetic disk, or an optical disc.

Figure 3:
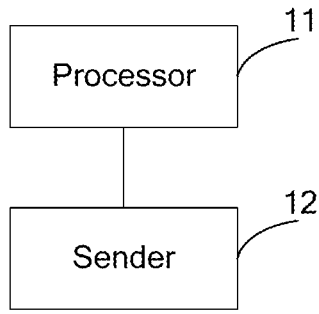
FIG. 3 is a schematic structural diagram of an embodiment of a transmitter provided in the present invention.

FIG. 3 is a schematic structural diagram of an embodiment of a transmitter provided in the present invention. As shown in FIG. 3, the transmitter includes a processor 11 and a sender 12. The processor 11 is configured to obtain information about a power fading point of a fiber channel between the transmitter and a receiving end; and determine, according to the information about the power fading point, a subcarrier that is used to send a service signal to the receiving end on the fiber channel, where a frequency of the determined subcarrier is different from that of the power fading point. The sender 12 is configured to send a service signal to the receiving end by using the determined subcarrier.

Figure 4:
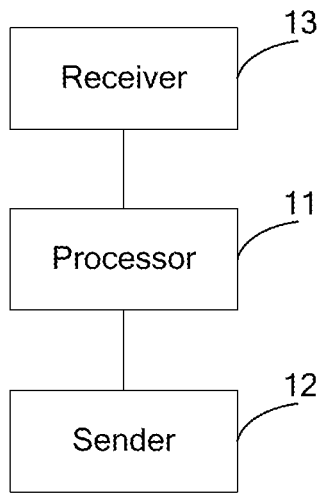
FIG. 4 is a schematic structural diagram of another embodiment of the transmitter provided in the present invention.

FIG. 4 is a schematic structural diagram of another embodiment of the transmitter provided in the present invention. As shown in FIG. 4, on a basis of the embodiment shown in FIG. 3, optionally, the processor 11 may be further configured to obtain a frequency domain response of the fiber channel between the transmitter and the receiving end, and determine the power fading point of the fiber channel according to the frequency domain response.

Optionally, the frequency domain response that is of the fiber channel between the transmitter and the receiving end and obtained by the processor 11 may be specifically a frequency domain response of each of fiber channels with multiple kinds of transmission distances.

Optionally, that the processor 11 determines the power fading point of the fiber channel according to the frequency domain response may specifically include that: the processor 11 determines a power fading point of each fiber channel with a corresponding transmission distance according to a frequency domain response of the fiber channel with the corresponding transmission distance.

Optionally, the sender 12 may be further configured to send a first test signal to the receiving end, where, after passing through the fiber channel, the first test signal arrives at the receiving end.

Correspondingly, the transmitter may further include a receiver 13, configured to receive the frequency domain response of the fiber channel, where the frequency domain response is sent by the receiving end, and the frequency domain response of the fiber channel is obtained by the receiving end according to the received first test signal.

Optionally, that the processor 11 determines, according to the information about the power fading point, a subcarrier that is used to send a service signal to the receiving end on the fiber channel may specifically include that: when the information about the power fading point is specifically information about the power fading point of each of the fiber channels with multiple kinds of transmission distances, the processor 11 determines, according to information about the power fading point of the fiber channel with each kind of transmission distance, a subcarrier that is used to send a service on the fiber channel with the kind of transmission distance, where a frequency of the subcarrier that is determined by the processor 11 and used to send a service signal on the fiber channel with each kind of transmission distance is different from that of the power fading point of the fiber channel with this kind of transmission distance.

Optionally, that the sender 12 sends a service signal to the receiving end by using the determined subcarrier may specifically include that: when the information about the power fading point is specifically information about the power fading point of each of the fiber channels with multiple kinds of transmission distances, the sender 12 selects, according to a distance between the transmitter and the receiving end, a corresponding subcarrier from the subcarrier that is used to send a service on the fiber channel with each kind of transmission distance, to send the service signal.

Optionally, the processor 11 may be further configured to: after the determining a subcarrier that is used to send a service signal to the receiving end on the fiber channel, divide the determined subcarrier into at least two parts, and determine a modulation scheme for sending a service signal on each part of the subcarrier.

Optionally, the sender 12 may be further configured to send a second test signal on the determined subcarrier by using at least two kinds of modulation schemes.

That the processor 11 divides the determined subcarrier into at least two parts, and determines a modulation scheme for sending a service signal on each part of the subcarrier may specifically include that: the processor 11 determines, in the determined subcarrier, a subcarrier applicable to each kind of modulation scheme according to a performance indicator, of the second test signal, that is corresponding to each kind of modulation scheme at the receiving end.

Optionally, that the sender 12 sends a second test signal on the determined subcarrier by using at least two kinds of modulation schemes may specifically include that: the sender 12 sends the second test signal on the determined subcarrier by using a first kind of modulation scheme; and when part of a performance indicator of the second test signal in the second test signal that is sent by using the first kind of modulation scheme and received at the receiving end is poorer than a set value, the sender 12 sends, by using a second kind of modulation scheme, the second test signal on a subcarrier corresponding to the second test signal whose performance indicator is poorer than the set value.

Correspondingly, that the processor 11 determines, in the determined subcarrier, a subcarrier applicable to each kind of modulation scheme according to a performance indicator, of the second test signal, that is corresponding to each kind of modulation scheme at the receiving end may specifically include: setting a subcarrier corresponding to a second test signal whose performance indicator is not poorer than the set value and that is sent by using the first kind of modulation scheme and received at the receiving end as a subcarrier applicable to sending a service signal by using the first kind of modulation scheme; and setting a subcarrier corresponding to a second test signal whose performance indicator is not poorer than the set value and that is sent by using the second kind of modulation scheme and received at the receiving end as a subcarrier applicable to sending a service signal by using the second kind of modulation scheme.

Optionally, an order of the first kind of modulation scheme may be higher than an order of the second kind of modulation scheme.

Optionally, that the sender 12 sends a service signal to the receiving end by using the determined subcarrier may specifically include: sending the service signal on the corresponding subcarrier by using the modulation scheme for sending a service signal on each part of the subcarrier.

Optionally, the performance indicator may include a bit error rate and/or a signal-to-noise ratio.

The transmitter provided in the embodiment of the present invention is an executing device of the signal transmission method provided in the embodiments of the present invention. For a process of executing the signal transmission method by the transmitter, reference may be made to the embodiments of the signal transmission method that are provided in FIG. 1 and FIG. 2 of the present invention, and details are not repeatedly described herein.

The transmitter provided in the embodiment of the present invention determines, according to information about a power fading point of a fiber channel between the transmitter and a receiving end, a subcarrier that is used to send a service signal to the receiving end on the fiber channel, and sends a service signal to the receiving end on the determined subcarrier; so that, when sending the service signal, the transmitter can bypass the power fading point, thereby ensuring validity of a signal spectrum and ensuring that transmitted data can be effectively recovered at the receiving end.

Figure 5:
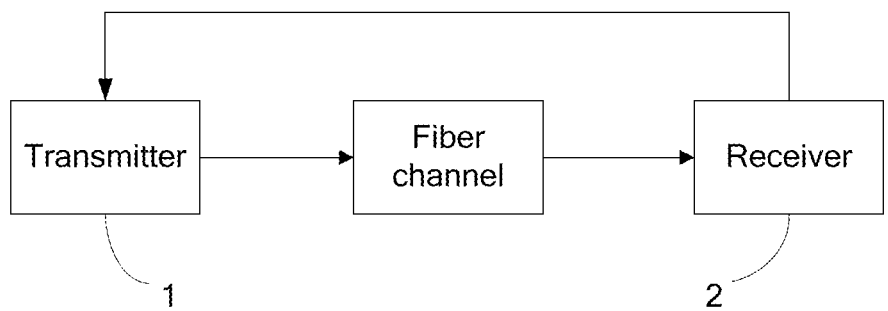
FIG. 5 is a schematic structural diagram of an embodiment of a signal transmission system provided in the present invention.

FIG. 5 is a schematic structural diagram of an embodiment of a signal transmission system provided in the present invention. As shown in FIG. 5, the signal transmission system may include a transmitter 1 and a receiver 2. The transmitter 1 is configured to obtain information about a power fading point of a fiber channel between the transmitter 1 and the receiver 2. The transmitter 1 is further configured to determine, according to the information about the power fading point, a subcarrier that is used to send a service signal to a receiving end 2 on the fiber channel, where a frequency of the determined subcarrier is different from that of the power fading point; and send a service signal to the receiving end 2 by using the determined subcarrier. The receiver 2 is configured to receive the service signal sent by the transmitter 1.

In the signal transmission system provided in the embodiment of the present invention, for a specific process of a signal transmission method executed by the transmitter, reference may be made to the embodiments of the signal transmission method that are provided in FIG. 1 and FIG. 2 of the present invention, and details are not repeatedly described herein.

According to the signal transmission system provided in the embodiment of the present invention, a transmitter determines, according to information about a power fading point of a fiber channel between the transmitter and a receiver, a subcarrier that is used to send a service signal to a receiving end on the fiber channel, and sends a service signal to the receiver on the determined subcarrier; so that, when sending the service signal, the transmitter can bypass the power fading point, thereby ensuring validity of a signal spectrum and ensuring that transmitted data can be effectively recovered at the receiving end.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A signal transmission method comprising:
obtaining, by a sending end, information about a power fading point of a fiber channel between the sending end and a receiving end, wherein the obtaining, by a sending end, information about a power fading point of a fiber channel between the sending end and a receiving end comprises:
obtaining, by the sending end, a frequency domain response of the fiber channel between the sending end and the receiving end, and
determining, by the sending end, the power fading point of the fiber channel according to the frequency domain response;
determining, by the sending end and according to the information about the power fading point, a subcarrier that is used to send a service signal to the receiving end on the fiber channel, wherein a frequency of the determined subcarrier is different from that of the power fading point; and
sending, by the sending end, a service signal to the receiving end by using the determined subcarrier.

2. The method according to claim 1, wherein the obtaining, by the sending end, a frequency domain response of the fiber channel between the sending end and the receiving end specifically comprises:
obtaining, by the sending end, a frequency domain response of each of the fiber channel with multiple kinds of transmission distances.

3. The method according to claim 2, wherein the determining, by the sending end, the power fading point of the fiber channel according to the frequency domain response specifically comprises:
determining, by the sending end, a power fading point of each of the fiber channel with a corresponding transmission distance according to a frequency domain response of the fiber channel with the corresponding transmission distance.

4. The method according to claim 1, wherein after the determining a subcarrier that is used to send a service signal to the receiving end on the fiber channel, the method further comprises:
sending, by the sending end, a test signal on determined subcarriers by using at least two kinds of modulation schemes; and
determining, by the sending end and in the determined subcarriers, a subcarrier applicable to each kind of modulation scheme according to a performance indicator, of the test signal, that is corresponding to its respective modulation scheme at the receiving end.

5. A transmitter comprising:
a processor;
a memory storing program instructions to be executed in the processor, the program instructions comprising instructions that cause the processor to:
obtain a frequency domain response of a fiber channel between the transmitter and a receiving end,
determine a power fading point of a fiber channel according to the frequency domain response,
obtain information about the power fading point of the fiber channel between the transmitter and the receiving end, and
determine, according to the information about the power fading point, a subcarrier that is used to send a service signal to the receiving end on the fiber channel, wherein a frequency of the determined subcarrier is different from that of the power fading point; and
a sender configured to send a service signal to the receiving end by using the determined subcarrier.

6. The transmitter according to claim 5, wherein the sender is further configured to send a test signal on determined subcarriers by using at least two kinds of modulation schemes, and wherein the processor is configured to determine, in the determined subcarriers, a subcarrier applicable to each kind of modulation scheme according to a performance indicator, of the test signal, that is corresponding to its respective modulation scheme at the receiving end.

7. The transmitter according to claim 5, wherein the program instructions comprise further instructions that cause the processor to obtain the power fading point of the fiber channel according to the frequency domain response comprises determining a power fading point of the fiber channel with a corresponding transmission distance according to the frequency domain response of the fiber channel with the corresponding transmission distance.

8. The transmitter according to claim 5, wherein the frequency domain response of the fiber channel comprises a frequency domain response of each of the fiber channel with multiple kinds of transmission distances.

9. A signal transmission system comprising a transmitter and a receiver, wherein the transmitter comprises:
a processor a processor;
a memory storing program instructions to be executed in the processor, the program instructions comprising instructions that cause the processor to:
obtain a frequency domain response of a fiber channel between the transmitter and a receiving end,
determine a power fading point of the fiber channel according to the frequency domain response
obtain information about the power fading point of the fiber channel between the transmitter and the receiving end, and
determine, according to the information about the power fading point, a subcarrier that is used to send a service signal to the receiving end on the fiber channel, wherein a frequency of the determined subcarrier is different from that of the power fading point; and
a sender configured to send a service signal to the receiving end by using the determined subcarrier.

10. The signal transmission system according to claim 9, wherein the sender is further configured to send a test signal on determined subcarriers by using at least two kinds of modulation schemes, and wherein the processor is configured to determine, in the determined subcarriers, a subcarrier applicable to each kind of modulation scheme according to a performance indicator, of the test signal, that is corresponding to its respective modulation scheme at the receiving end.

11. The signal transmission system according to claim 9, wherein the program instructions further comprise instructions that cause the processor to determine the power fading point of the fiber channel according to the frequency domain by determining a power fading point of the fiber channel with a corresponding transmission distance according to a frequency domain response of the fiber channel with the corresponding transmission distance.

12. The signal transmission system according to claim 9, wherein the frequency domain response of the fiber channel comprises a frequency domain response of each of the fiber channel with multiple kinds of transmission distances.

* * * * *